Patented Nov. 6, 1934

1,979,303

UNITED STATES PATENT OFFICE 1,979,303

PROCESSING ALCOHOLS

John C. Woodhouse, Wilmington, Del., assignor to E. I. du Pont de Nemours & Company, Wilmington, Del., a corporation of Delaware No Drawing. Application December 27, 1932, Serial No. 648,983

5 Claims. (Cl. 260—156)

This invention relates to the removal of color from alcohols and more particularly to the removal of color from the higher alcohols-containing mixtures or fractions thereof, boiling above methanol, obtainable by the catalytic hydrogenation of oxide of carbon under pressure.

The existence of color is frequently a commercially disadvantageous characteristic of freshly prepared synthetic higher alcohols, and particularly of the higher alcohols-containing mixtures, boiling above methanol, obtainable by the catalytic hydrogenation of oxide of carbon under pressure. The intensity of color in the above described higher alcohols increases somewhat as does the boiling point, being more marked in the higher boiling fractions, and is not removable by distillation.

It is an object of this invention to overcome this disadvantage and to provide a new and improved method for color removal from synthetically prepared higher alcohols.

Other objects and advantages of this invention will be apparent by reference to the following specification wherein its details and preferred embodiments are described.

According to the present invention higher alcohols generally, and higher synthetic alcohols as above described particularly, or fractions thereof, are subjected to treatment with an alkali metal. At the expiration of the alkali metal treatment the alcohol may be decanted from unreacted metal and distilled and an absolutely colorless product obtained.

Although I have found that caustic soda is highly efficacious in color removal from the lower alcohols, synthetically prepared by the catalytic hydrogenation of oxide of carbon, however, in the case of the higher synthetic alcohols, such, for example, as those produced by the said catalytic hydrogenation of oxide of carbon, and boiling in a relatively higher range, such, for example, as above 165° C., the caustic soda treatment is not sufficient for successful color removal. In the case of the higher synthetic alcohols boiling above 165° C., however, I have found that absolute color removal and a water-white product is obtained by subjecting the said higher alcohol or higher alcohols-containing mixture, or fractions thereof, as the case may be, to the action of an alkali metal, such as metallic sodium, potassium, lithium, rubidium, or caesium. The amount of alkali metal utilized according to my invention may vary over a wide range but, altho large amounts may be used, relatively small amounts are more economical and I have found such smaller amounts to be sufficiently efficacious.

Altho the proportions and methods utilized and the conditions followed may vary over a wide range, the following examples will serve to illustrate the preferred procedure according to my invention:

*Example 1.*—Approximately 1.5 grams of solid metallic sodium was added to 1000 c.c. of a light orange colored mixture of higher alcohols boiling in the range between 165–202° C. and obtained by the catalytic hydrogenation of oxide of carbon under pressure; the material was allowed to stand in contact with the sodium at normal temperature for a period of three days. At the expiration of the treatment period the alcohol-containing mixture was decanted from any unreacted sodium and distilled at atmospheric pressure to give an absolutely colorless product comprising 93% of the original alcohol. The remaining 7% not distilled comprised solid sodium alcoholate which was formed by reaction with the metallic sodium.

*Example 2.*—Approximately 1.5 grams of metallic sodium was cut into small strips and added to 200 c.c. of an orange yellow colored fraction of the mixture of higher alcohols obtained as described in Example 1, but boiling in the range of 195–240° C. The alcohols were allowed to stand in contact with the metallic sodium for three days at normal temperature to give, upon distillation, after decantation from the unreacted sodium, 94% of the original alcohol as an absolutely colorless product.

*Example 3.*—A dark orange colored fraction of the above described higher alcohols, boiling in the range of 165–275° C. was treated with metallic sodium such as described in the previous examples to give a colorless product of water-white alcohols.

Altho description has been made in the examples of treatment by metallic sodium in which the alcohols-mixture has been decanted from unreacted sodium before distillation, it is often practically convenient not to decant the alcohol from the decolorizing mixture but to distill directly. It will be understood, therefore, that a treatment such as described in the examples, i.e. distillation of the alcohols after decantation from the unreacted sodium, may be substituted for by a method in which distillation is carried on directly in the presence of unreacted alkali metal and/or the alcoholates formed.

It will also be understood, notwithstanding the fact that in the examples allusion has been made specifically to the use of metallic sodium as a color removing agent, that the other alkali metals, for example, lithium, rubidium, caesium, and potassium, and condensing agents in general such as aluminum chloride, zinc chloride, and the like, are also commercially advantageously used as color removing agents according to the above described procedure.

It will be recognized that the color removing procedure above described is satisfactory for the removal of colored components when the alcohols are distilled after having stood in contact with the specified agent, yet, if the formation of further colored products is to be avoided, subsequent distillation must take place at a sufficiently reduced temperature and pressure as to avoid cracking in the still pot or column.

Various changes may be made in the details and methods of the invention without departing therefrom or sacrificing any of the advantages thereof.

I claim:

1. A process for the removal of color from the colored higher alcohols-containing mixture obtainable by the catalytic hydrogenation of oxide of carbon under pressure and boiling above 165° C. which comprises treating said materials with metallic sodium as a decolorizing agent.

2. A process for the removal of color from the colored higher alcohols-containing mixture obtainable by the catalytic hydrogenation of oxide of carbon under pressure and boiling in the range of from about 165–275° C. which comprises treating said materials with alkali metal as a decolorizing agent.

3. A process for color removal from colored higher alcohols boiling above 165° C. and obtainable by catalytic hydrogenation of oxide of carbon under pressure which comprises utilizing as a decolorizing agent an alkali metal.

4. A process for the removal of color from the colored high alcohols-containing mixture obtainable by the catalytic hydrogenation of oxide of carbon under pressure and boiling above 165° C. which comprises treating said materials with an alkali metal as a decolorizing agent.

5. A process for the removal of color from the colored higher alcohols-containing mixture obtainable by the catalytic hydrogenation of oxide of carbon under pressure and boiling in the range of from about 165–275° C. which comprises treating said materials with an alkali metal as a decolorizing agent.

JOHN C. WOODHOUSE.